March 25, 1930.    A. F. MASURY    1,751,868
FREE WHEEL DRIVE
Filed Nov. 18, 1929
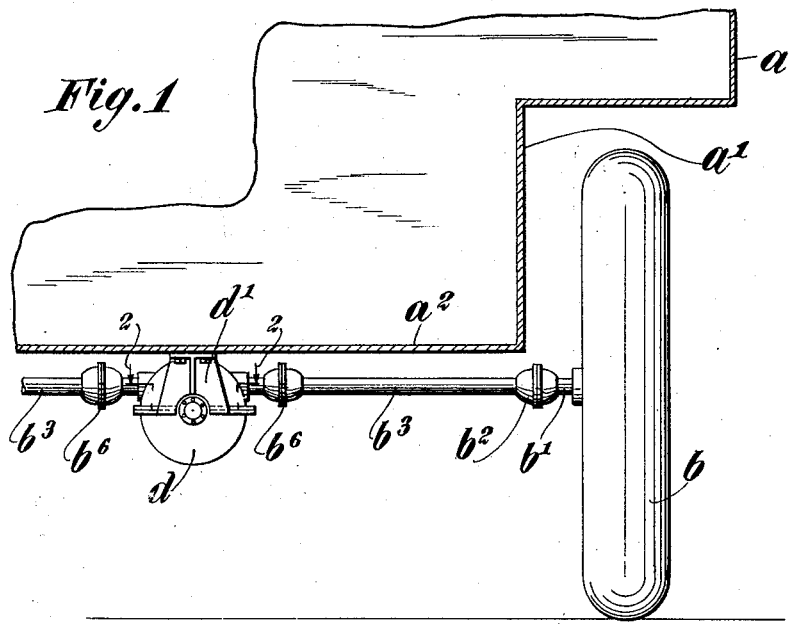
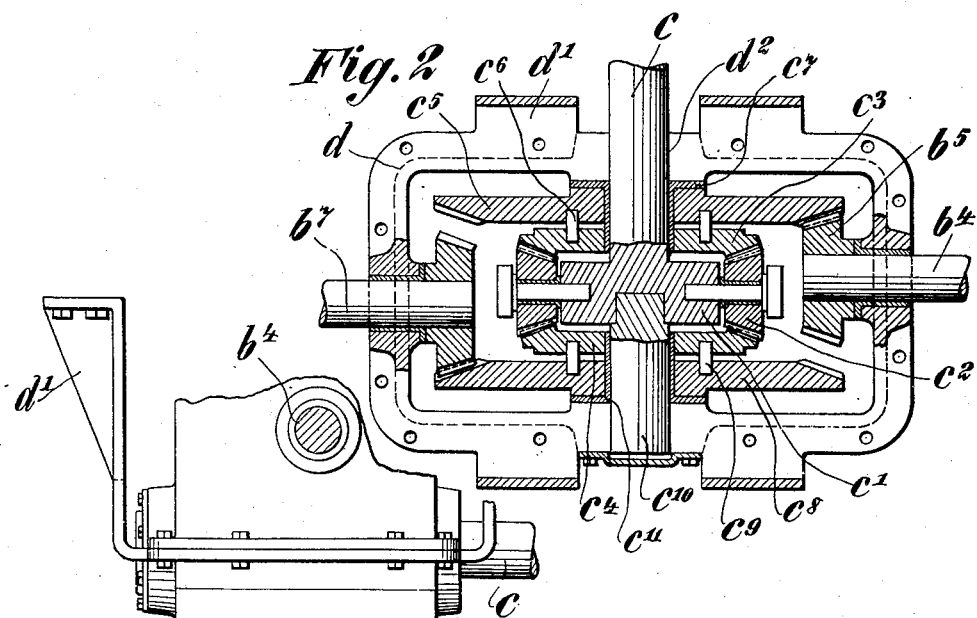
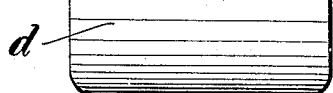
INVENTOR
Alfred F. Masury,
BY
his ATTORNEYS Patented Mar. 25, 1930

1,751,868

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FREE-WHEEL DRIVE

Application filed November 18, 1929. Serial No. 407,853.

The present invention relates to drives for motor vehicles and embodies, more specifically, an improved drive for free driving wheels of motor vehicles. These wheels are freely mounted for movement with respect to the frame and the drive is transmitted thereto by means of drive shafts connected to the power apportioning means and the respective wheels through suitable universal joints.

In commercial vehicles, it is well known that considerable attention has been devoted, heretofore, to the disposition of the driving elements to afford a maximum clearance above the aisles while maintaining a predetermined desired center of gravity of the body. The desirability of lowering the floor level with respect to the driving gear will be readily apparent and many existing designs have endeavored to overcome the normal conflict between the central aisle and necessary clearance for the differential by offsetting the latter with respect to the median plane of the vehicle, thus throwing any necessary projection in the floor to one side of the center line of the vehicle in order that it may be positioned under a seat.

With the present invention, however, the surface of the floor is maintained in a uniform and uninterrupted condition. The driving mechanism, including the rear differential, or apportioning means is mounted directly upon the frame as a sprung element thereof. From the differential, drive shafts extend laterally to transmit the drive to suitably mounted driving wheels upon the frame. Existing drives of this character have required the height of the frame above the ground to be at least a distance greater than that of the center line of the differential plus the radius of the differential housing. The drive from these differentials has been taken therefrom in a horizontal plane passing through the axis of the differentials. The present invention, however, permits the frame and floor level to be lowered appreciably below that of the corresponding elements of prior structures.

An object of the invention, accordingly, is to provide a drive for motor vehicles which is of such character that the elevation of the floor of the vehicle may be materially decreased.

A further object of the invention is to provide a drive of the above character in which power is taken from a differential to drive free wheels in such manner that the floor level of the vehicle may be materially decreased.

The above objects are attained by the provision of a differential or power apportioning means, mounted upon the frame and supplying power to the driving wheels through connections which lie in planes above a horizontal plane passing through the axis of the differential.

Further objects, not specifically enumerated above, will be apparent as the invention is described in greater detail in connection with the accompanying drawings, wherein:

Figure 1 is a view in section, showing a vehicle body provided with a drive constructed in accordance with the present invention.

Figure 2 is a view in section, taken on line 2—2 of Figure 1, and looking in the direction of the arrows.

Figure 3 is a view in side elevation, showing a differential constructed in accordance with the present invention.

Referring to the above drawings, $a$ designates a vehcle body having a wheel housing $a'$ and a floor $a^2$. A free driving wheel $b$ is mounted upon the frame in a suitable manner and power is supplied thereto by means of a stub axle $b'$ which is connected to a universal joint $b^2$. It is preferable, of course, that a wheel of this character be mounted on either side of the frame and suitable driving shafts $b^3$ supply power to the universal joints $b^2$ for driving the respective wheels.

A propeller shaft $c$ is driven from an engine and transmission of usual design and extends to a differential $d$, mounted upon the floor $a^2$ by means of suitable brackets $d'$. These brackets are shown as formed upon the differential housing but, of course, may be of any construction desired. The propeller shaft $c$ is journaled within the differential housing $d$ at $d^2$ and has formed on its extremity, a hub $c'$ upon which planetary pinions $c^2$ are journaled. These pinions drive suitable bevel gears $c^3$ and $c^4$, respectively, the forward bevel gear $c^3$ being secured to a larger driving gear $c^5$ by means of pins $c^6$. The gears $c^3$ and $c^5$ are journaled upon the shaft $c$ by means of a bearing member $c^7$ and the drive from the skew bevel gear $c^5$ is transmitted to a shaft section $b^4$ through a skew bevel pinion $c^5$. By forming the gears $b^5$ and $c^5$ with skew bevels, that is, utilizing hypoid gears, the axis of shaft $b^4$ may be elevated above the axis of the differential. Shaft $b^4$ drives a universal joint $b^6$ which, in turn, drives the appropriate shaft $b^3$. The rear differential gear $c^4$ is mounted upon a second skew bevel gear $c^8$, the two being connected by pins $c^9$ and mounted upon a shaft section $c^{10}$, journaled in the differential housing, through a suitable bearing $c^{11}$. From this driving gear $c^8$, power is transmitted to a second shaft section $b^7$ which drives a second universal joint $b^6$, as clearly shown in Figure 1.

From the foregoing description, it will be apparent that the provision of skew bevel driving gears in the differentials to take off power therefrom affords an effective way of reducing the floor level, since it may be materially lowered with respect to the shaft sections $b^3$ within the permissible limits of clearance. In existing designs, the factor of permissible limits of clearance between the floor level and shaft sections $b^3$ is not a vital factor in design since it has been necessary to make such clearance at least as great as the radius of the differential housing by reason of the fact that power was taken from the differential housing in a plane passing through the horizontal axis thereof. The radius of such housing, however, being considerably greater than the minimum permissible clearance between the shaft sections $b^3$ and the floor, results in a floor level which is considerably greater than necessary.

While the invention has been described with specific reference to the accompanying drawings, it is not to be limited, save as defined in the appended claims.

I claim as my invention:

1. A final drive for vehicles comprising driving wheels, a differential, a power shaft journaled in the differential housing and carrying driving planetary pinions, a stub shaft mounted in the housing, spaced bevel gears on opposite sides of the pinions journaled on the respective shafts, spaced skew bevel gears driven by the respective bevel gears and journaled on the respective shafts, shafts driving the respective wheels and mounted above the axis of the differential, and skew bevel pinions on the last named shafts engaging the respective skew bevel gears.

2. A final drive for vehicles comprising driving wheels, a differential, gears in the differential between which power is apportioned, spaced skew bevel gears mounted on the last named gears, shafts offset with respect to the axis of the differential for driving the wheels, and skew bevel pinions on the shafts engaging the respective skew bevel gears.

3. A final drive for vehicles comprising driving wheels, a differential, shafts between the wheel and differential, the axis of the shafts lying above the axis of the differential, spaced skew bevel gears in the differential housing between which the differential apportions power, and skew bevel pinions on the shafts engaging the respective gears.

4. A final drive for vehicles comprising a driving wheel, a differential, a shaft between the wheel and differential, the axis of the shaft lying above the axis of the differential, and skew bevel gears between the shaft and differential.

This specification signed this 15th day of November, A. D. 1929.

ALFRED F. MASURY.